July 4, 1961  H. C. WAGNER  2,990,601
METHOD OF MAKING REFRACTORY OBJECTS
Filed Nov. 21, 1958
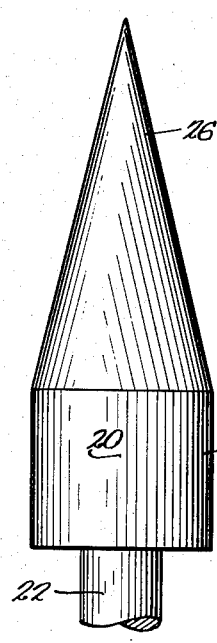
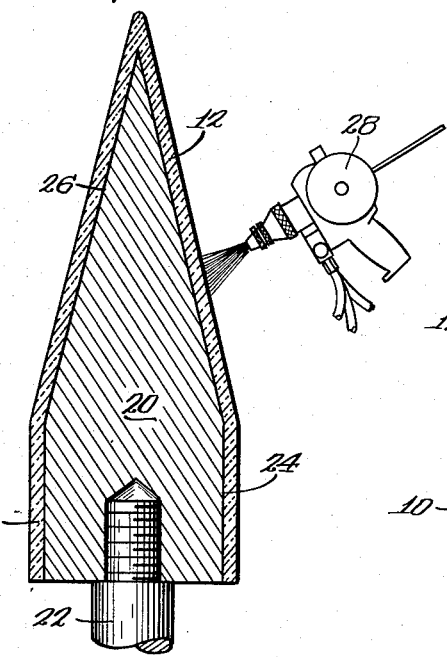
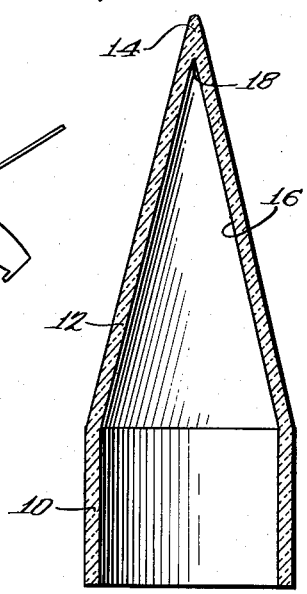
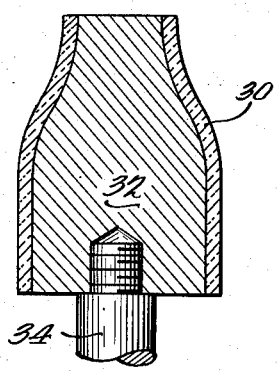
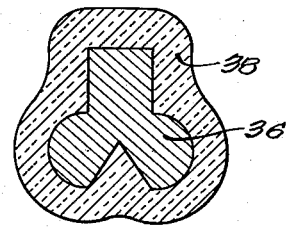
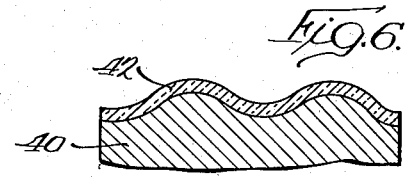
INVENTOR.
Harold C. Wagner
BY
Wupper, Gradolph & Love
Attys.

2,990,601
METHOD OF MAKING REFRACTORY OBJECTS

Harold C. Wagner, St. Joseph, Mich., assignor to Laboratory Equipment Corporation, St. Joseph, Mich., a corporation of Michigan Filed Nov. 21, 1958, Ser. No. 775,592
3 Claims. (Cl. 25—156)

The present invention relates to a method for making refractory objects. More particularly, it relates to the formation of objects for various uses from refractory substances, particularly metal oxides, having an extremely high melting temperature, such as aluminum oxide or zirconium oxide, for instance.

It is one of the objects of this invention to provide a novel method for the manufacture of objects of substances of an extremely refractory nature to extremely close dimensional tolerances, and with an excellent surface finish.

An additional object is to provide a novel method for the manufacture of highly refractory objects of very thin section, although the size of the object, if desired, may be quite large.

Yet another object is to provide improved missile cones, nozzles, extruding dies, and the like, which have an extremely high resistance to high temperatures and thermal shock, and which have high abrasive resistance.

Other objects and advantages will become apparent from the following description of a preferred embodiment of my invention, which is illustrated in the accompanying drawings.

In the drawings, in which similar characters of reference refer to similar parts throughout the several views, FIG. 1 is a side elevation of a form used in producing a refractory article according to the present invention;

FIG. 2 is a longitudinal medial sectional view, showing the manner of forming the highly refractory ceramic body upon the form of FIG. 1;

FIG. 3 is a longitudinal medial sectional view of the completed ceramic article, which may be considered as being a thin walled missile nose cone, for instance;

FIG. 4 is a view similar to FIG. 2, but showing the process as adapted for the production of a high temperature or abrasive resistant nozzle;

FIG. 5 is a transverse sectional view, showing the use of the process of the present invention for the production of an extruding die or the like intended for operation either at high temperatures or under conditions of high abrasive action, or both; and FIG. 6 is a vertical sectional view illustrating an alternative form of the invention.

Recently there has been a considerable demand for objects formed of ceramic or other materials which will withstand extremely high temperatures and a high order of thermal shock, and which will have a high order of resistance to abrasive action. Such objects as missile nose cones and nozzles which operate at extremely high temperatures are examples. For this purpose, such substances as aluminum oxide, zirconium oxide, and some spinels, for instance, are frequently used, but the current processes for the formation of such articles from aluminum oxide or zirconium oxide, for instance, are extremely expensive and leave much to be desired.

As an example, a typical method for forming a ceramic nose cone of a high temperature ceramic material, such as aluminum oxide, consists in forming the damp plastic ceramic body to appropriate shape in a mold or over a mandrel and then compacting this material, such as by enclosing it in a rubber envelope which is subjected to hydraulic pressure, after which the shape is removed from the form and set aside to dry. Thereafter it is fired in a kiln at the appropriate high temperature.

During the drying and the firing process, considerable shrinkage occurs which cannot be fully allowed for, and furthermore, the shape is almost certain to warp to some extent, with the result that the fired article must be made overly thick and ground to final size and shape, and this grinding usually is required on both the inside and outside surfaces. The result of this current method for forming such articles (which follows with slight variation the classic ceramic techniques) is that much of the manufactured material must be rejected as unsuitable, and such articles as are satisfactory are extremely expensive.

Furthermore, it is not possible to produce ceramic objects in this manner in thin sections, because under these conditions the warpage and cracking during drying and in the kiln becomes excessive, and the articles, prior to firing, are too delicate to handle.

By the use of my process I have formed nose cones and similar objects of aluminum oxide and zirconium oxide, and such materials, in almost any thickness, down to cones, for instance, with a wall thickness of less than 0.16 of an inch. So far as I know, such thickness dimensions for ceramic objects of this character are completely without precedent.

With reference to the drawings, the cone of FIG. 3 is comprised of a cylindrical portion 10 joined to a long tapered conical section 12 having its apex at 14. As formed by the present process, the inside surface 16 will be extremely smooth and, if desired, the inside apex at 18 may be made needle sharp without difficulty. In this connection, it is desired to point out that a shape of this general character has considerable utility and is expensive to manufacture, particularly if the wall thickness is to be relatively thin and if the interior and external surfaces are to be smooth and held to close dimensions. This is because warpage and shrinkage, which can be only approximately predicted, will require that the inside surface, as well as the external surface, be ground, and in addition to the ordinary expense associated with such grinding, it will be appreciated that the inside apex, as at 18, must, if ground, result in a substantial radius or lack of sharpness at this point. An article of this character, formed of aluminum oxide, for instance, is therefore quite expensive as presently produced.

To form such an article according to my method, I provide a mandrel 20 as shown in FIG. 1. This mandrel is mounted upon a spindle 22 so that it may be slowly rotated about its axis. Its cylindrical portion 24 and conical portion 26 are the exact counterpart of the inside surface of the cone to be produced when the mandrel 20 is at a temperature of approximately 500° F. This mandrel may be machined from any of several metals, and for this purpose I have found aluminum to be highly satisfactory, although steel, brass, and other metals, including chromium plated metals, have been used successfully. After being so shaped, the mandrel should have a reasonably high spectral finish so as to produce a similar finish on the inside surface of the cone of FIG. 3, and for a further purpose to be discussed presently. This mandrel is then heated to a temperature of over 500° F. and is slowly rotated while being flame sprayed with the melted refractory material, as is illustrated in FIG. 2.

The flame spray gun indicated at 28 may be any of several, and Patent No. 2,707,691, issued to W. M. Wheildon, Jr., on May 3, 1955, for "Coating Metals and Other Materials With Oxide and Articles Made Thereby" will serve as an example of one manner of melting and applying the refractory materials in an atomized condition. In general, a small diameter rod of sintered aluminum oxide or zirconium oxide, or like highly refractory material, is slowly fed into a cluster of oxyacetylene flames so that it is progressively melted and the melted particles are then atomized and projected against the object to be coated by a compressed air blast. Other similar processes use the metal oxide in powder form rather than as rods, and such processes are also suitable for my purpose.

These flame spray processes are used for coating a metal or other body or form so as to produce a tightly adherent refractory coating well bonded to the basic material, as is well explained in the previously referred to Wheildon patent.

I have found, however, that if the mandrel, such as that of FIG. 1, has a reasonably smooth surface, and if it is preheated to 500° F. or so, and if it is then spray coated with the melted refractory material while hot, the particles sprayed thereon will adhere sufficiently to the mandrel to remain in place until additional layers of the refractory material are applied and become bonded together so that a wall thickness of the refractory material of any desired extent may be built up by continued spraying of the rotating form. Under these conditions, however, the refractory body does not bond to the mandrel. After coating, the mandrel with the refractory object thereon is set aside and allowed to cool. The mandrel, as it cools, will shrink slightly relative to the ceramic article, with the result that the refractory article completely separates from the mandrel so that it can simply be lifted off, thereby producing the object of FIG. 3.

It is important that the mandrel be formed of a material which has a higher coefficient of thermal expansion than the refractory material being used, and that it be preheated as described, and that the surface of the mandrel be relatively smooth.

If the surface of an aluminum mandrel is not smooth, the refractory coating applied thereto will not be removable. On the other hand, if the mandrel is sufficiently smooth to satisfy the requirement of removability, the sprayed melted refractory particles will not stick to the mandrel. They simply blow away as a dust or flake off in small particles unless the mandrel is heated to about 500° F. Above this critical temperature the first spray particles stick well enough, even to a smooth mandrel to remain in place until they are covered by the next layer. After a few layers of the refractory material have been applied, a drop in the mandrel temperature is not important, since at this juncture the ceramic shape is sufficiently self sustaining and the atomized particles of the melted refractory substance will bond without difficulty to the surface of the cold ceramic shape. The critical mandrel high temperature, therefore, applies only at the beginning of the spray coating operation and until the first few layers have been applied.

If the mandrel has a sharp point or other thin section, like the mandrel of FIG. 1, for instance, it is preferred to coat this portion first with a few layers before it cools and then work toward the thicker sections which cool more slowly. Of course, electric heaters within the mandrel may be used to maintain a selected temperature, if desired, but ordinarily no difficulty will be experienced if the mandrel is simply preheated in an oven or in a flame, for instance. The use of metals, such as aluminum, which have high thermal conductivity also is advantageous in helping to equalize the temperature between thick and thin mandrel portions.

Different mandrel materials and different surface finishes have some effect upon the critical temperature. For instance, to obtain adhesion, a fine turned finish upon an aluminum mandrel requires a critical temperature of about 500° F. as measured by a surface pyrometer. The same finish upon steel requires about 550° F., while brass requires about 700° F. Highly polished surfaces require somewhat higher temperatures, roughly 100° F. higher, as an example. As a practical matter, the problem is not as complicated as it might appear, since overheating a few hundred degrees does little damage so long as the mandrel material does not melt locally when struck by a small high temperature particle of the melted ceramic substance.

FIG. 4 shows the use of the process of FIGS. 1, 2, and 3 for the production of a simple high temperature nozzle. In this view, the nozzle desired is indicated at 30, this nozzle being built up by hot spraying aluminum oxide, for instance, upon a form 32 mounted upon a spindle 34. As previously described, the mandrel 32 is formed of smooth, preferably polished, metal and is preheated to 500° F. or so and is slowly rotated as the ceramic body 30 is built up thereon by hot spraying. After an appropriate thickness of the refractory material has been achieved, the mandrel with the ceramic nozzle thereon is set aside to cool. During cooling, the nozzle portion 30 will separate and may be lifted off the mandrel. Thereafter the mandrel is again heated to above 500° F. and used to produce another nozzle, which is a duplicate of the first.

In some manufacturing processes there is a need for extruding dies or similar articles which are required to be used at extremely high temperatures or under conditions where the material to be extruded is quite abrasive. Aluminum oxide satisfactorily meets both of these requirements and can be used to produce an extruding die as shown in FIG. 5. Here a mandrel 36 is formed to the desired contour for the inside of the die. As in the previous examples, this mandrel is made of metal and is polished so as to provide a good finish. It is then heated to 500° F. or so, and aluminum oxide is then hot sprayed thereon so as to build up the body indicated at 38. After this aluminum oxide body has reached an appropriate thickness, the mandrel 36 is set aside and allowed to cool. In so doing the mandrel shrinks slightly away from the aluminum oxide body, with the result that the aluminum oxide member 38 may be slid off the mandrel and mounted in any desired fixture for incorporation into the extruding machine.

In all of the examples given above, the article produced will have an extremely smooth even finish upon its inside surface, this finish being determined very largely by the degree of polish upon the mandrel upon which it is formed. If the mandrel, as in FIG. 1, is provided with a sharp point, this point will be substantially exactly duplicated in the refractory article so that the inside apex as at 18 in FIG. 3, for instance, may be needle sharp if desired.

By the use of this process any warpage or shrinkage that may occur is below what can be detected by any ordinary means, and it is thus unnecessary to grind or otherwise finish the interior surface of the refractory article.

In some instances it may be necessary to grind the external surface slightly, however, since the spray application may not be sufficiently even. If the cone of FIG. 3, for instance, is required to have extremely close dimensional tolerances upon its external surface, and an extremely smooth external finish, this may be easily provided by a grinding operation. This is relatively simple, since all grinding is conducted externally and the job is not complicated by the problems which are inherent in internal grinding. In many instances, however, this external grinding operation is unnecessary. For instance, the articles of FIGS. 4 and 5 are critical as to their internal dimensions and finish, but the external finish, size, and shape are of little consequence.

Where the ceramic article desired is a plate—either flat, curved, or with a highly irregular surface—as is illustrated in FIG. 6, the same technique is used excepting that the mandrel 40 is a smooth plate and, under some conditions, may not be rotated while being spray coated with the ceramic 42.

From the above description of my process it will be appreciated that highly refractory and abrasive resistant objects, with melting temperatures, if desired, well above 4000° F. (zirconia melts at about 4700° F. for instance) may be manufactured at relatively low cost to closer dimentional tolerances and with better surface finish, and with less thickness than has heretofore been possible. Of course other ceramic and cermet materials which can be melted and spray applied can be used in place of alumina or zirconia which were specifically discussed above, inasmuch as they are more difficult to handle than most materials because of their high melting temperatures. It will also be appreciated that variations in the basic process may be made without departing from the scope or spirit of my invention, and that the scope of the invention is to be measured by the scope of the following claims.

In the claims, the phrase "hollow objects of the type which can be shaped upon a mandrel and removed therefrom" appears to be self-explanatory. It excludes such hollow objects as spheres or other cavity shapes in which some constriction in the object prevents its removal from a mandrel even though it could, of course, be shaped thereon.

Having described my invention, what I claim as new and useful and desire to secure by Letters Patent of the United States is:

1. The method of producing hollow objects of the type which can be shaped upon a mandrel and removed therefrom of highly refractory metal oxide substances which comprises providing a mandrel having an external smooth surface which complements the internal surface contour of the object to be produced, the mandrel being formed of a material having a greater coefficient of thermal expansion than the refractory substance, heating the mandrel to a critical temperature in excess of substantially 500° F., flame spraying the hot mandrel with particles of the refractory metal oxide substance in the melted state so as to provide a continuous solidified layer of the refractory substance upon the mandrel before the mandrel has cooled substantially below said critical temperature, continuing the flame spraying operation until the refractory object has been built up to the desired thickness upon the mandrel, cooling the mandrel with the object thereon to shrink the mandrel relative to the object to effect a separation therebetween, and removing the object from the mandrel.

2. The method of producing plates of highly refractory metal oxide substances which comprises providing a mandrel having a smooth surface which complements the surface contour of one side of the plate, the mandrel being formed of a material having a greater coefficient of thermal expansion than the refractory substance, heating the mandrel to a critical temperature in excess of substantially 500° F., flame spraying the hot mandrel with particles of the refractory metal oxide substance in the melted state so as to provide a continuous solidified layer of the refractory substance upon the mandrel before the mandrel has cooled substantially below said critical temperature, continuing the flame spraying operation until the refractory object has been built up to the desired thickness upon the mandrel, cooling the mandrel with the object thereon to shrink the mandrel relative to the object to effect a separation therebetween, and removing the object from the mandrel, the surface finish of the mandrel being sufficiently smooth that the sprayed, melted, metal oxide will not adhere thereto at or about ambient room temperature.

3. The method of producing objects of the type which can be shaped upon a mandrel and removed therefrom of highly refractory metal oxide substances which comprises providing a mandrel having a smooth surface which complements one surface contour of the object to be produced, the mandrel being formed of a material having a greater coefficient of thermal expansion than the refractory substance, heating the mandrel to above the critical temperature, flame spraying the hot mandrel with particles of the refractory metal oxide substances in the melted state so as to provide a continuous solidified layer of the refractory substance upon the mandrel before the mandrel has cooled substantially below the critical temperature, the surface finish of said mandrel being sufficiently smooth that the particles of melted, metal oxide sprayed thereon will not adhere thereto at a certain low mandrel temperature, the critical temperature being higher than said certain low mandrel temperature and that at which particles of the ceramic substance resulting from flame spraying will temporarily adhere to the mandrel, but below that at which the mandrel is locally melted by the said particles, continuing the flame spraying operation until the refractory object has been built up to the desired thickness upon the mandrel, cooling the mandrel with the object thereon to shrink the mandrel relative to the object to effect a separtion therebetween, and removing the object from the mandrel.

References Cited in the file of this patent
UNITED STATES PATENTS

| | | |
|---|---|---|
| 1,128,175 | Morf | Feb. 9, 1915 |
| 1,808,047 | Littleton, et al. | June 2, 1931 |
| 2,252,898 | Pollack | Aug. 19, 1941 |
| 2,272,342 | Hyde | Feb. 10, 1942 |
| 2,707,691 | Wheildon | May 3, 1955 |

UNITED STATES PATENT OFFICE
CERTIFICATE OF CORRECTION

Patent No. 2,990,601                                                      July 4, 1961

Harold C. Wagner

It is hereby certified that error appears in the above numbered patent requiring correction and that the said Letters Patent should read as corrected below.

Column 2, line 24, for "0.16" read -- .016 --; column 6, line 24, for "substances" read -- substance --.

Signed and sealed this 21st day of November 1961.

(SEAL)
Attest:

ERNEST W. SWIDER                                         DAVID L. LADD
Attesting Officer                                           Commissioner of Patents

USCOMM-DC